US012565976B2

(12) United States Patent
Zeuner

(10) Patent No.: US 12,565,976 B2
(45) Date of Patent: Mar. 3, 2026

(54) ILLUMINATION SYSTEM FOR A VEHICLE

(71) Applicant: ZKW Group GmbH, Wieselburg (AT)

(72) Inventor: Markus Zeuner, Mank (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 19/013,333

(22) Filed: Jan. 8, 2025

(65) Prior Publication Data

US 2025/0264200 A1 Aug. 21, 2025

(30) Foreign Application Priority Data

Feb. 15, 2024 (EP) ..................................... 24157868

(51) Int. Cl.
| | |
|---|---|
| *F21S 41/43* | (2018.01) |
| *F21S 41/143* | (2018.01) |
| *F21S 41/27* | (2018.01) |
| *F21V 11/14* | (2006.01) |
| *B60R 19/50* | (2006.01) |
| *F21W 121/00* | (2006.01) |

(52) U.S. Cl.
CPC ............. *F21S 41/43* (2018.01); *F21S 41/143* (2018.01); *F21S 41/27* (2018.01); *F21V 11/14* (2013.01); *B60R 2019/505* (2013.01); *F21W 2121/008* (2013.01)

(58) Field of Classification Search
CPC .......... F21S 41/43; F21S 41/143; F21S 41/27; F21V 11/14; F21W 2121/008
See application file for complete search history.

(56) References Cited

U.S. PATENT DOCUMENTS 3,639,748 A * 2/1972 Pearson ............... B60Q 1/2626
293/120
6,558,022 B2 * 5/2003 Kawahara ................. F21V 5/04
446/485

(Continued)

FOREIGN PATENT DOCUMENTS

EP 3912862 A2 11/2021

OTHER PUBLICATIONS

Extended European Search Report for European Patent Application No. 24157868.1, dated Jun. 13, 2024 (9 Pages).

*Primary Examiner* — Tracie Y Green
*Assistant Examiner* — Michael Chiang
(74) *Attorney, Agent, or Firm* — Eversheds Sutherland (US) LLP

(57) ABSTRACT

Illumination system (1) for a vehicle, including at least one lighting device (2), including at least two, individually controllable, light sources (3a, 3b), and a lens element (4), arranged downstream of the two light sources, and a vehicle body component (5). The lens element is configured to emit a first light bundle and a second light bundle towards the vehicle body component, respectively. The vehicle body component includes an opaque section (6) and a plurality of transparent elements (7), embedded within the opaque section. The plurality of transparent elements is defined by at least one parent-group (PG) of transparent elements (7, 7'), said PG is divided into at least two sub-groups (SG). The lens element is configured to redirect the first light bundle towards the first sub-group (SG1) of transparent elements and to redirect the second light bundle towards the second sub-group (SG2) of transparent elements.

19 Claims, 3 Drawing Sheets

(56)  References Cited

U.S. PATENT DOCUMENTS

| | | | | |
|---|---|---|---|---|
| 7,350,949 | B2 * | 4/2008 | Meinke | B60Q 1/5037 |
| | | | | 362/540 |
| 10,011,215 | B2 * | 7/2018 | Roberts | F21S 45/50 |
| 10,637,977 | B1 * | 4/2020 | Wang | H04M 1/0249 |
| 10,723,257 | B2 * | 7/2020 | Salter | B60Q 1/2661 |
| 2005/0270789 | A1 * | 12/2005 | Lueftner | B60R 1/1207 |
| | | | | 362/545 |
| 2020/0247307 | A1 * | 8/2020 | Tsutsumi | B60R 11/04 |
| 2020/0406845 | A1 * | 12/2020 | Sonoda | B60R 19/50 |
| 2023/0066487 | A1 * | 3/2023 | Yang | F21S 10/00 |
| 2024/0019096 | A1 | 1/2024 | Kim et al. | |
| 2025/0146647 | A1 * | 5/2025 | Krijn | G10K 11/16 |

* cited by examiner

ILLUMINATION SYSTEM FOR A VEHICLE

CROSS-REFERENCE TO RELATED APPLICATIONS

This application claims priority to European Patent Application No. 24157868.1, filed Feb. 15, 2024, which is incorporated herein by reference.

FIELD OF THE INVENTION

The invention relates to an illumination system for a vehicle, wherein the illumination system includes: (i) at least one lighting device, comprising at least two, individually controllable, light sources, configured to emit light along a main direction of light propagation. and a lens element, arranged downstream of the at least two light sources along the main direction of light propagation, said lens element is configured to receive a first light bundle from a first light source of the at least two light sources and emit said first light bundle, preferably along the main direction of light propagation, and to receive a second light bundle from a second light source of the at least two light sources and emit said second light bundle, preferably along the main direction of light propagation; and (ii) a vehicle body component, arranged downstream of the lens element along the main direction of light propagation, wherein the lens element is configured to emit the first light bundle and the second light bundle towards the vehicle body component, respectively, said vehicle body component comprises an opaque section, configured to block light emitted by the lens element and a plurality of transparent elements, embedded within the opaque section, configured to let light emitted from the lens element pass through the vehicle body component along the main direction of light propagation, wherein adjacent transparent elements are distanced to each other, with a distance greater than zero in a main plane of the vehicle body component, preferably said main plane is orthogonal to the main direction of light propagation, wherein the plurality of transparent elements is defined by at least one parent-group of transparent elements, said parent-group is divided into at least two sub-groups, wherein at least one, preferably at least two, transparent elements define a first sub-group, wherein at least one, preferably at least two, different transparent elements, which are not part of the first sub-group, define a second sub-group. Further, the invention relates to a vehicle, comprising an illumination system.

BACKGROUND

Illumination systems for vehicles, comprising a lighting device and a vehicle body component, which gets illuminated by the lighting device, are known in the prior art. When the vehicle body component comprises sections that should be illuminated and sections that are not to be illuminated (e.g., to achieve a dynamic illumination effect of a specific pattern), usually, the lighting device of the illumination system comprises multiple light sources, wherein each section of the vehicle body component that should be illuminated is associated with a specific light source. A disadvantage of such a system is that it requires a large number of light sources, that need to be controlled individually. In essence, the number of light sources must be equal or larger than the number of illuminated sections.

SUMMARY OF THE INVENTION

It is an object of the invention to provide an illumination system, that improves the illumination of a vehicle body component.

To achieve this object the lens element is configured to redirect the first light bundle of the first light source towards the first sub-group of transparent elements and to redirect the second light bundle of the second light source towards the second sub-group of transparent elements, such that in a state of operation, in which the first light source and the second light source emit light, the first sub-group of transparent elements and the second sub-group of transparent elements is illuminated by its respective light source, and in a state of operation, in which only one of the at least two light sources emit light, only one of the at least two sub-group of transparent elements, which is associated with the light emitting light source, is illuminated.

This has the advantage, that the first sub-group gets illuminated by the first light source and the second sub-group gets illuminated by the second light source, therefore, reducing the number of required light sources. In particular, a number of transparent elements of the first sub-group, which can comprise a plurality (e.g., two, three, four, or more) of transparent elements, can be illuminated by the first light source, which can be a single light source, which light gets directed towards the first sub-group by the lens element. Furthermore, a number of transparent elements of the second sub-group, which can comprise a plurality (e.g., two, three, four, or more) of transparent elements, can be illuminated by the second light source, which can be a single light source, which light gets directed towards the second sub-group by the lens element.

In other words, the number of transparent elements which get illuminated can exceed the number of light sources, and as such, the system becomes more efficient by requiring fewer light sources. That means that the illumination system according to the invention can be cheaper and less complicated to control. A distance, along the main direction of light propagation x, between the at least two light sources and the lens element can be approximately 10 mm. A distance, along the main direction of light propagation x, between the lens element and the vehicle body component can be between 10 mm and 100 mm, preferably 20 mm. Two adjacent transparent elements can be distanced to each other in a main plane of the vehicle body component (said main plane is orthogonal to the main direction of light propagation), said distance is preferably between 10 mm and 300 mm, in particular 22 mm. The lens element can be a bi-convex, planar-convex, spherical, or aspherical lens. In this disclosure, light propagating along a certain direction, does not mean that light rays are parallel to each other and to a straight line (e.g., an optical axis) representing the certain direction. Light sources in this disclosure may have Lambertian radiation characteristics, and emitted light propagates along a direction which can be represented by a distance between two objections, e.g., the lighting device and the lens element, or the lens element and the vehicle body component.

Advantageously, the vehicle body component comprises a back surface facing the lens element and a front surface averting the lens element, wherein the vehicle body component is arranged to the at least one lighting device such that light emitted from the lens element illuminates the back surface, wherein each transparent element of the plurality of transparent elements penetrate through the vehicle body component from the back surface to the front surface.

Advantageously, each transparent element of the plurality of transparent elements is surrounded, preferably entirely, by the opaque section of the vehicle body component.

Advantageously, each transparent element is configured as a through-hole, formed within the vehicle body component, wherein a boundary limiting the through-hole has a particular shape, e.g., circular, square, triangular, oval, polygonal or star-shaped, wherein each through hole is filled with a transparent material.

Advantageously, each transparent element has a similar or different shape in the main plane of the vehicle body component, wherein preferably a diameter, in the main plane of the vehicle body component, of each shape is equal or different for each transparent element.

Advantageously, the vehicle body component is a front bumper, rear bumper, or a radiator grill, in particular a closed radiator grill, for example for an electric car.

Advantageously, the at least two light sources are distanced, along the main direction of light propagation, to the lens element, wherein said distance is shorter than a focal length of the lens element, wherein preferably the at least two light sources are arranged or centered around an optical axis of the lens element, wherein preferably a perpendicular distance between the optical axis and the first light source and a perpendicular distance between the optical axis and the second light source are equal, wherein preferably the lens element is arranged relative to the at least two light sources such that the optical axis is oriented parallel to the main direction of light propagation.

Advantageously, the at least one lighting device comprises a multi-chip-LED, wherein the first light source corresponds to a first chip of the multi-chip-LED and the second light source corresponds to a second chip of the multi-chip-LED, or, wherein the at least two light sources are configured as a single-chip-LED respectively, or, wherein the at least one lighting device comprises a light emitting phosphor layer, preferably oriented orthogonal to the main direction of light propagation, said phosphor layer is separated into at least two light emitting sections by a non-light emitting separation layer, wherein the first light source corresponds to a first light emitting section and the second light source corresponds to a second light emitting section.

Advantageously, the lens element is configured to refract the first light bundle and the second light bundle, such that the refracted first light bundle and the refracted second light bundle propagate, preferably converge, towards the optical axis of the lens element, respectively, wherein preferably the lens element comprises a projections lens which projects the light of the light source to the back surface of the vehicle body component, wherein preferably the lens element comprises a projection lens configured to project the first light bundle towards the first sub-group of transparent elements, and the second light bundle towards the second sub-group of transparent elements.

Advantageously, the at least two light sources are arranged relative to each other and relative to the lens element such that the first light bundle and the second light bundle are distanced to each other, with a distance greater than zero in a plane that is orthogonal to an optical axis of the lens element, wherein each light bundle illuminates, preferably entirely, a light receiving surface of the lens element respectively.

Advantageously, the at least two light sources are arranged, with a distance greater than zero between each other, on a light source holder, wherein the light source holder is arranged relative to the lens element such that the main direction of light propagation of light emitted by the at least two light sources is, between the at least two light sources and the lens element, parallel to the optical axis of the lens element, wherein preferably the light source holder and a periphery section of the lens element, said periphery portion is optically inactive, form a casing, which encloses the at least two light sources, wherein preferably the light source holder comprises a mounting surface on which the at least two light sources are mounted to, wherein the light source holder is arranged relative to the lens element such that the mounting surface is orthogonal to the optical axis of the lens element.

Advantageously, the at least one lighting device comprises three, four, or more light sources, wherein each light source is configured to emit a light bundle along the main direction of light propagation, wherein the lens element is configured to receive light bundles from all light sources and redirect said light bundles towards the vehicle body component, wherein the at least one parent-group of transparent elements comprises a number of sub-groups, said number of sub-groups corresponds to the number of light sources of the at least one lighting device, wherein each sub-group of transparent elements is associated to a specific light source, wherein the lens element is configured to redirect light received from a specific light source towards the sub-group of transparent elements, to which the specific light source is associated, wherein preferably the illumination system comprises a control device, configured to individually control the three, four, or more light sources of the lighting device.

Advantageously, the illumination system comprises a plurality of lighting devices, wherein the plurality of transparent elements is defined by a plurality of parent-groups, wherein each lighting device is associated to a parent-group of the plurality of parent-groups, such that light emitted by a specific lighting device illuminates transparent elements of the parent-group, to which the specific lighting device is associated, and such that light emitted by a specific light source of the specific lighting device illuminates a sub-group which corresponds to the specific light source, said sub-group is part of the parent-group that is associated to the specific lighting device, wherein preferably the number of lighting devices is equal to the number of parent-groups, wherein preferably each lighting device is associated to exactly one parent-group, wherein preferably the illumination system comprises a control device, configured to individually control the plurality of lighting devices and the individual light of each of the plurality of lighting devices.

Advantageously, a sub-group is defined by three or more transparent elements, wherein preferably a parent-group is defined by three or more sub-groups.

Advantageously, the at least two light sources are arranged on the light source holder in such a way that the first light bundle and the second light bundle overlap at least partially at the light receiving surface of the lens element.

According to another aspect of the invention, a vehicle can be provided, comprising an illumination system.

BRIEF DESCRIPTION OF THE DRAWINGS

In the following, in order to further demonstrate the present invention, illustrative and non-restrictive embodiments are discussed, as shown in the drawings.

DETAILED DESCRIPTION OF EMBODIMENTS

Figure 1:
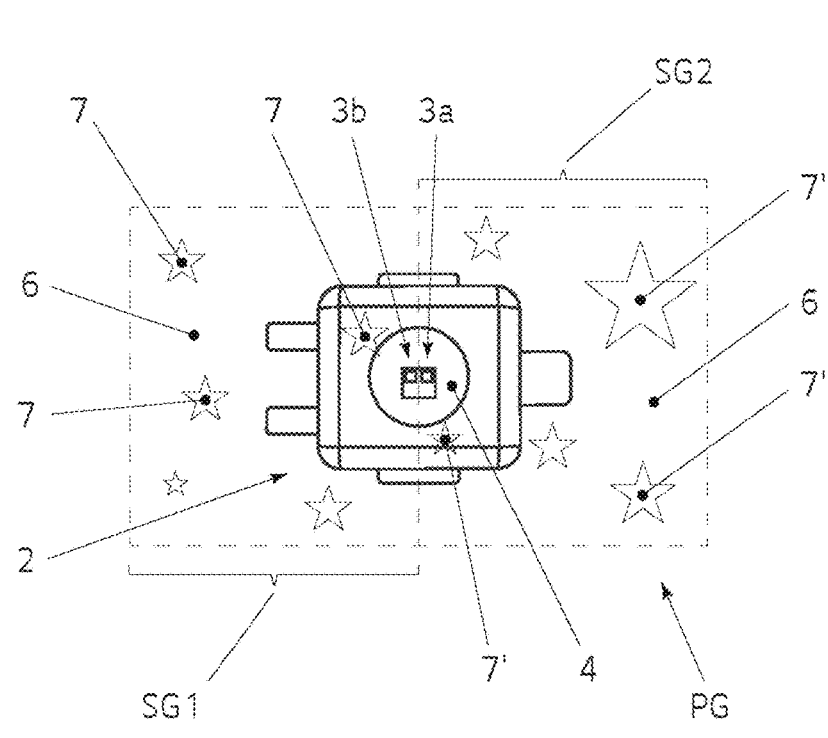
FIG. 1 shows a front view of an illumination system according to the invention.

FIG. 1 shows a schematic front view of an illumination system 1 for a vehicle. The illumination system comprises a lighting device 2, which comprises at least two, individually controllable, light sources 3a, 3b. The light sources 3a, 3b are configured to emit light along a main direction of light propagation x. In the shown embodiment, the light sources 3a, 3b are configured as a multi-chip-LED, wherein a first light source 3a corresponds to a first chip of the multi-chip-LED and a second light source 3b corresponds to a second chip of the multi-chip-LED.

The lighting device 2 comprises a lens element 4, arranged downstream of the at least two light sources 3a, 3b along the main direction of light propagation x. The lens element 4 is configured to receive a first light bundle from the first light source 3a of the at least two light sources 3a, 3b and to emit said first light bundle along the main direction of light propagation x. The lens element 4 is further configured and to receive a second light bundle from the second light source 3b of the at least two light sources 3a, 3b and to emit said second light bundle along the main direction of light propagation x.

Figure 2:
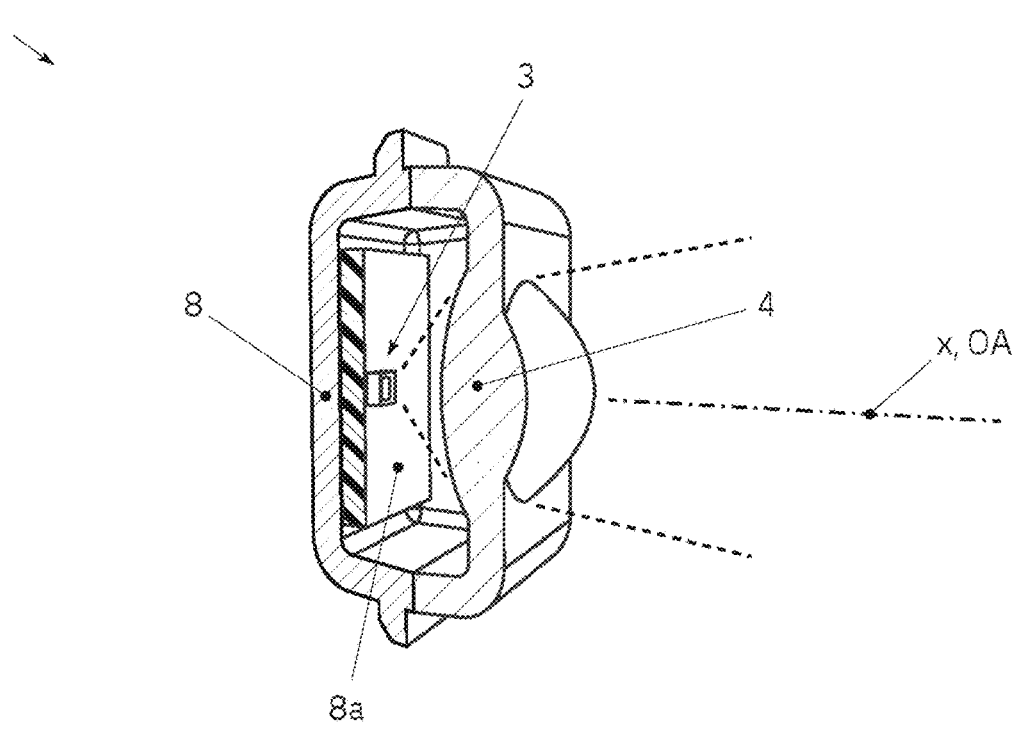
FIG. 2 shows a perspective view of a lighting device of an illumination system according to the invention.

FIG. 2 shows a detailed view of an embodiment of a lighting device 2. In the shown embodiment, the light source 3 of the lighting device 2 comprises a light emitting phosphor layer (in contrast to the multi-chip LED shown in FIG. 1), which is separated into at least two light emitting sections by a non-light emitting separation layer. Due to the separation of the phosphor layer the light source 3 has two distinct light emitting regions, and is therefore similar to the multi-chip LED in terms of light emitting characteristics and functionality.

The light source 3 (which can alternatively comprise a multi-chip LED as described above) is mounted on a light source holder 8, which is arranged relative to the lens element 4 such that light emitted by the light source 3 propagates along the optical axis OA of the lens element 4 towards a vehicle body component 5 (described further down below). The light source holder 8 and a periphery section of the lens element 4, said periphery portion is optically inactive, form a casing, which encloses the light source 3. The light source holder 8 comprises a mounting surface 8a on which the light source 3 is mounted to. The light source holder 8 is arranged relative to the lens element 4 such that the mounting surface 8a is orthogonal to the optical axis OA of the lens element 4.

Advantageously, the light source holder 8 can comprise a housing of the light device 2 and a printed circuit board, the printed circuit board can comprise the mounting surface 8a.

The illumination system 1 comprises a vehicle body component 5, arranged downstream of the lens element 4 along the main direction of light propagation x. The lens element 4 is configured to emit the first light bundle and the second light bundle towards the vehicle body component 5, respectively. The vehicle body component 5 comprises an opaque section 6, configured to block light emitted by the lens element 4 and a plurality of transparent elements 7, embedded within the opaque section 6, configured to let light emitted from the lens element 4 pass through the vehicle body component 5 along the main direction of light propagation x. Adjacent transparent elements 7 are distanced to each other, with a distance greater than zero in a main plane of the vehicle body component 5, said main plane is orthogonal to the main direction of light propagation x.

The plurality of transparent elements 7 are defined by at least one parent-group PG of transparent elements 7, said parent-group PG is divided into at least two sub-groups SG, wherein at least one, preferably at least two (or multiple), transparent elements 7 define a first sub-group SG1, wherein at least one, preferably at least two (or multiple), different transparent elements 7', which are not part of the first sub-group SG1, define a second sub-group SG2. Each transparent element 7 has a similar or different shape in the main plane of the vehicle body component 5. In the embodiment shown in FIG. 1, the transparent elements 7, 7' are star-shaped and have non-uniform sizes.

The lens element 4 is configured to redirect the first light bundle of the first light source 3a towards the first sub-group SG1 of transparent elements 7 and to redirect the second light bundle of the second light source 3b towards the second sub-group SG2 of transparent elements 7'. Consequently, in a state of operation, in which the first light source 3a and the second light source 3b emit light, the first sub-group SG1 of transparent elements 7 and the second sub-group SG2 of transparent elements 7' is illuminated by its respective light source 3a, 3b. In a state of operation, in which only one of the at least two light sources 3a, 3b emit light, only one of the at least two sub-group SG1, SG2 of transparent elements 7, 7', which is associated with the light emitting light source 3a, 3b, is illuminated.

Figure 3:
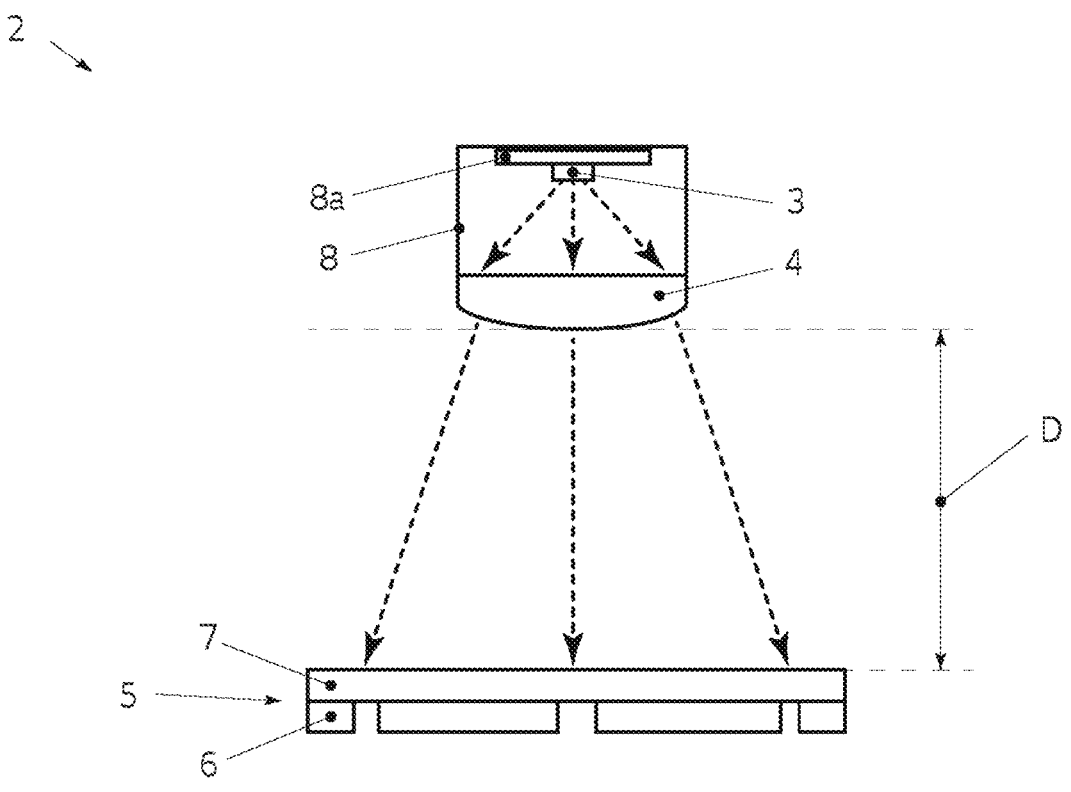
FIG. 3 shows a top-down view of the illumination system of FIG. 1.

As shown in FIG. 3, the vehicle body component 5 comprises a back surface facing the lens element 4 and a front surface averting the lens element 4. The vehicle body component 5 is arranged to the at least one lighting device 2 such that light emitted from the lens element 4 illuminates the back surface. The distance D between the lens element 4 and the vehicle body component 5 is preferably between 10 mm and 100 mm, in particular 20 mm.

FIG. 3 shows a different embodiment of the vehicle body component 5. A transparent element 7 is covered by an opaque section 6. In the opaque section 6, three gaps are formed, which have a specific form and are configured to let light pass through. Alternatively, as described above, each transparent element 7, 7' of the plurality of transparent elements 7 is surrounded, preferably entirely, by the opaque section 6 of the vehicle body component 5.

The lens element 4 is configured to refract the first light bundle and the second light bundle, such that the refracted first light bundle and the refracted second light bundle propagate, preferably converge, towards the optical axis OA of the lens element 4, respectively. In the shown embodiments, the lens element 4 comprises a projections lens which projects the light of the light source 3, 3a, 3b to the back surface of the vehicle body component (the projection lens 4 mirrors the light image created by the lighting device 2). This can be seen in FIG. 1, where the light source 3a is located on the right side and illuminates the transparent elements 7 of SG1 located on the left side. On the other hand, the light source 3b, located on the left side illuminates the transparent elements 7' of SG2 located on the right side.

Figure 4:
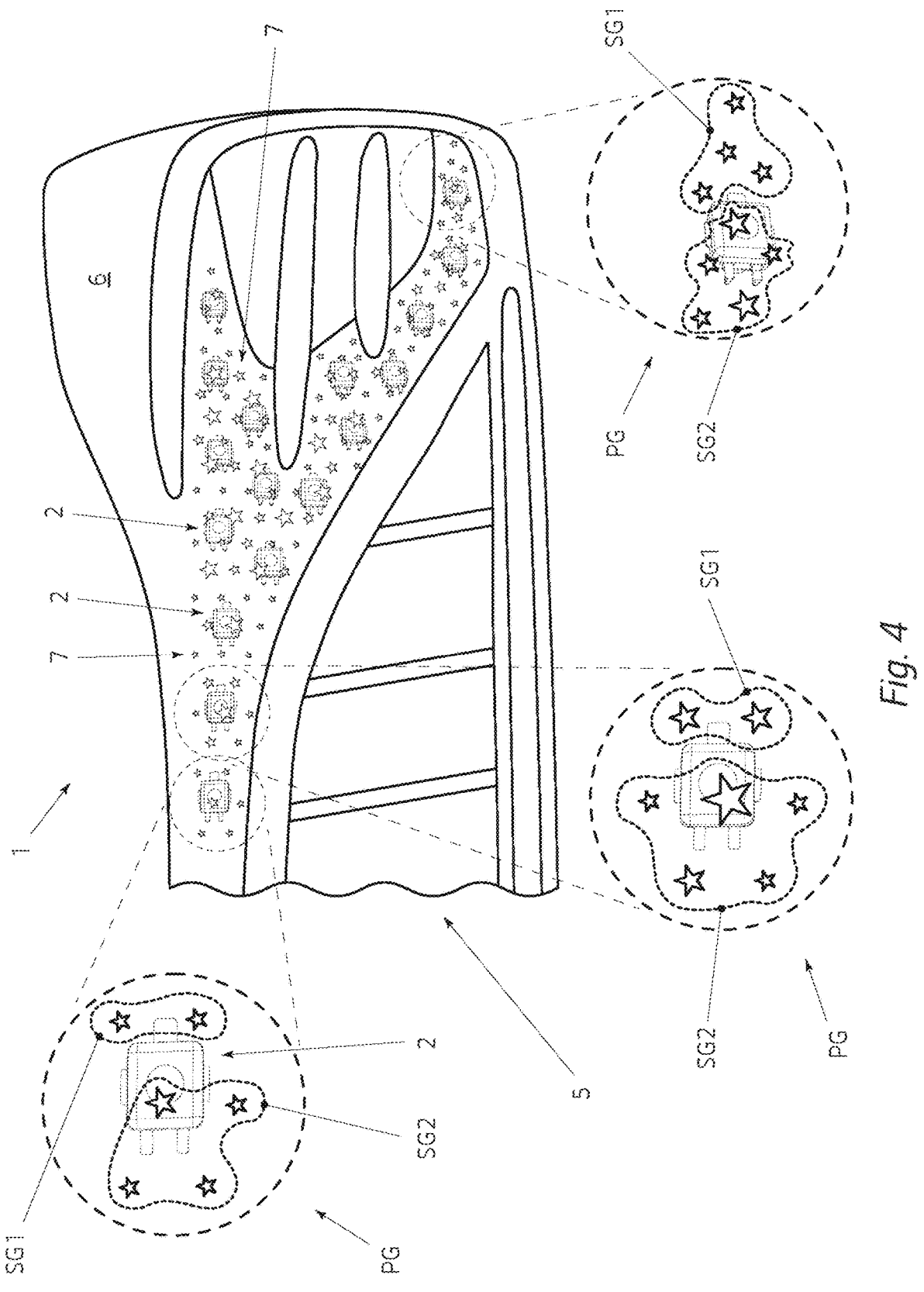
FIG. 4 shows a schematic view of a second embodiment of an illumination system according to the invention.

FIG. 4 shows another embodiment of the illumination system 1, wherein the illumination system 1 comprises a plurality of lighting devices 2 and the plurality of transparent elements 7 is defined by a plurality of parent-groups PG.

FIG. 4 shows a radiator grill as an example of a vehicle body component 5. In the opaque section 6, a total number of seventeen parent-groups PG of transparent elements 7 are embedded. Three of these parent-groups PG are shown in three dashed circles which show a magnified view of the corresponding parent group PG. Each parent-group PG is divided into two sub-groups SG1, SG2, and each sub-group SG is defined by (in the shown embodiment) two to five transparent elements 7, in this case, stars.

A lighting device 2 (comprising at least two or more light sources) is associated to each parent-group PG, wherein the illumination of the transparent elements 7, 7' works as described for the embodiment of FIG. 1. Each lighting device 2 is associated to exactly one parent-group PG. The illumination system 1 may comprise a control device (not shown), configured to individually control the plurality of lighting devices 2 and their light sources respectively.

LIST OF REFERENCE SYMBOLS

1 Illumination system
2 Lighting device
3 Light sources
3a First light source
3b Second light source
4 Lens element
5 Vehicle body component
6 Opaque section
7, 7' Transparent element
8 Holder
8a Mounting surface
D Distance
OA Optical axis
PG Parent-group
SG Sub-group
SG1 First sub-group
SG2 Second sub-group
x Main direction of light propagation That which is claimed is:

1. An illumination system (1) for a vehicle, the illumination system comprising:

at least one lighting device (2), comprising at least two, individually controllable, light sources (3a, 3b), configured to emit light along a main direction of light propagation (x), and a lens element (4), arranged downstream of the at least two light sources (3a, 3b) along the main direction of light propagation (x), wherein the lens element (4) is configured to receive a first light bundle from a first light source (3a) of the at least two light sources (3a, 3b) and emit the first light bundle along the main direction of light propagation (x), and to receive a second light bundle from a second light source (3b) of the at least two light sources (3a, 3b) and emit the second light bundle along the main direction of light propagation (x); and a vehicle body component (5), arranged downstream of the lens element (4) along the main direction of light propagation (x), wherein the lens element (4) is configured to emit the first light bundle and the second light bundle towards the vehicle body component (5), respectively, wherein the vehicle body component (5) comprises an opaque section (6), configured to block light emitted by the lens element (4) and a plurality of transparent elements (7), embedded within the opaque section (6), configured to let light emitted from the lens element (4) pass through the vehicle body component (5) along the main direction of light propagation (x), wherein adjacent transparent elements (7) are distanced to each other, with a distance greater than zero in a main plane of the vehicle body component (5), wherein the main plane is orthogonal to the main direction of light propagation (x), wherein the plurality of transparent elements (7) are defined by at least one parent-group (PG) of transparent elements (7), said parent-group (PG) is divided into at least two sub-groups (SG), wherein at least two transparent elements (7) define a first sub-group (SG1), wherein at least two different transparent elements (7'), which are not part of the first sub-group (SG1), define a second sub-group (SG2), wherein the lens element (4) is configured to redirect the first light bundle of the first light source (3a) towards the first sub-group (SG1) of transparent elements (7) and to redirect the second light bundle of the second light source (3b) towards the second sub-group (SG2) of transparent elements (7'), such that in a state of operation, in which the first light source (3a) and the second light source (3b) emit light, the first sub-group (SG1) of transparent elements (7) and the second sub-group (SG2) of transparent elements (7') is illuminated by its respective light source (3a, 3b), and in a state of operation, in which only one of the at least two light sources (3a, 3b) emit light, only one of the at least two sub-group (SG1, SG2) of transparent elements (7, 7'), which is associated with the light emitting light source (3a, 3b), is illuminated, and wherein the vehicle body component (5) comprises a back surface facing the lens element (4) and a front surface averting the lens element (4), and wherein the lens element (4) is configured to refract the first light bundle and the second light bundle, such that the refracted first light bundle and the refracted second light bundle propagate towards the optical axis (OA) of the lens element (4), respectively, wherein the lens element (4) comprises a projections lens which projects the light of the light source (3, 3a, 3b) to the back surface of the vehicle body component (5), wherein the lens element (4) comprises a projection lens configured to project the first light bundle towards the first sub-group (SG1) of transparent elements (7), and the second light bundle towards the second sub-group (SG2) of transparent elements (7').

2. The illumination system according to claim 1, wherein the vehicle body component (5) is arranged to the at least one lighting device (2) such that light emitted from the lens element (4) illuminates the back surface, wherein each transparent element (7, 7') of the plurality of transparent elements (7) penetrate through the vehicle body component (5) from the back surface to the front surface.

3. The illumination system according to claim 1, wherein each transparent element (7, 7') of the plurality of transparent elements (7) is surrounded, by the opaque section (6) of the vehicle body component (5).

4. The illumination system according to claim 1, wherein each transparent element (7) is configured as a through-hole, formed within the vehicle body component (5), wherein a boundary limiting the through-hole has a particular shape, and wherein each through hole is filled with a transparent material.

5. The illumination system according to claim 4, wherein the particular shape is circular, square, triangular, oval, polygonal, or star-shaped.

6. The illumination system according to claim 1, wherein each transparent element (7) has a similar or different shape in the main plane of the vehicle body component (5), wherein a diameter, in the main plane of the vehicle body component (5), of each shape is equal or different for each transparent element (7).

7. The illumination system according to claim 1, wherein the vehicle body component (5) is a front bumper, rear bumper, or a radiator grill.

8. The illumination system according to claim 7, wherein the vehicle body component (5) is a closed radiator grill.

9. The illumination system according to claim 1, wherein the at least two light sources (3a, 3b) are distanced, along the main direction of light propagation (x), to the lens element (4), wherein said distance is shorter than a focal length of the lens element (4), wherein preferably the at least two light sources (3*a*, 3*b*) are arranged or centered around an optical axis (OA) of the lens element (4).

10. The illumination system according to claim 9, wherein a perpendicular distance between the optical axis (OA) and the first light source (3*a*) and a perpendicular distance between the optical axis (OA) and the second light source (3*b*) are equal, wherein the lens element (4) is arranged relative to the at least two light sources (3*a*, 3*b*) such that the optical axis (OA) is oriented parallel to the main direction of light propagation (x).

11. The illumination system according to claim 1, wherein the at least one lighting device (2) comprises a multi-chip-LED, wherein a first light source (3*a*) of the at least two light sources corresponds to a first chip of the multi-chip-LED and a second light source (3*b*) of the at least two light sources corresponds to a second chip of the multi-chip-LED, or wherein each of the at least two light sources (3*a*, 3*b*) is configured as a single-chip-LED.

12. The illumination system according to claim 1, wherein the at least two light sources (3*a*, 3*b*) are arranged relative to each other and relative to the lens element (4) such that the first light bundle and the second light bundle are distanced to each other, with a distance greater than zero in a plane that is orthogonal to an optical axis (OA) of the lens element (4), wherein each light bundle illuminates a light receiving surface of the lens element (4) respectively.

13. The illumination system according to claim 1, wherein the at least two light sources (3*a*, 3*b*) are arranged, with a distance greater than zero between each other, on a light source holder (8), wherein the light source holder (8) is arranged relative to the lens element (4) such that the main direction of light propagation (x) of light emitted by the at least two light sources (3*a*, 3*b*) is, between the at least two light sources (3*a*, 3*b*) and the lens element (4), parallel to the optical axis (OA) of the lens element (4), wherein the light source holder (8) and a periphery section of the lens element (4), said periphery section is optically inactive, form a casing, which encloses the at least two light sources (3*a*, 3*b*), wherein the light source holder (8) comprises a mounting surface (8*a*) on which the at least two light sources (3*a*, 3*b*) are mounted to, wherein the light source holder (8) is arranged relative to the lens element (4) such that the mounting surface (8*a*) is orthogonal to the optical axis (OA) of the lens element (4).

14. The illumination system according to claim 1, wherein the at least one lighting device (2) comprises three, four, or more light sources (3, 3*a*, 3*b*), wherein each light source (3, 3*a*, 3*b*) is configured to emit a light bundle along the main direction of light propagation (x), wherein the lens element (4) is configured to receive light bundles from all light sources (3, 3*a*, 3*b*) and redirect said light bundles towards the vehicle body component (5), wherein the at least one parent-group (PG) of transparent elements (7) comprises a number of sub-groups (SG), said number of sub-groups (SG) corresponds to the number of light sources (3, 3*a*, 3*b*) of the at least one lighting device (2), wherein each sub-group (SG) of transparent elements (7) is associated to a specific light source (3, 3*a*, 3*b*), wherein the lens element (4) is configured to redirect light received from a specific light source (3, 3*a*, 3*b*) towards the sub-group (SG) of transparent elements (7), to which the specific light source (3, 3*a*, 3*b*) is associated, wherein the illumination system (1) comprises a control device, configured to individually control the three, four, or more light sources (3, 3*a*, 3*b*) of the lighting device (2).

15. The illumination system according to claim 1, wherein the illumination system (1) comprises a plurality of lighting devices (2), wherein the plurality of transparent elements (7) is defined by a plurality of parent-groups (PG), wherein each lighting device (2) is associated to a parent-group (PG) of the plurality of parent-groups (PG), such that light emitted by a specific lighting device (2) illuminates transparent elements (7) of the parent-group (PG), to which the specific lighting device (2) is associated, and such that light emitted by a specific light source (3, 3*a*, 3*b*) of the specific lighting device (2) illuminates a sub-group (SG) which corresponds to the specific light source (3, 3*a*, 3*b*), said sub-group (SG) is part of the parent-group (PG) that is associated to the specific lighting device (2), wherein the number of lighting devices (2) is equal to the number of parent-groups (PG), wherein each lighting device (2) is associated to exactly one parent-group (PG), wherein the illumination system (1) comprises a control device, configured to individually control the plurality of lighting devices (2) and the individual light sources (3, 3*a*, 3*b*) of each of the plurality of lighting devices (2).

16. The illumination system according to claim 1, wherein a sub-group (SG) is defined by three or more transparent elements (7), wherein a parent-group (PG) is defined by three or more sub-groups (SG).

17. A vehicle comprising the illumination system (1) according to claim 1.

18. The illumination system of claim 1, wherein the refracted first light bundle and the refracted second light bundle converge towards the optical axis (OA) of the lens element (4).

19. The illumination system according to claim 1, wherein the at least one lighting device (2) comprises a light emitting phosphor layer, oriented orthogonal to the main direction of light propagation (x), wherein the phosphor layer is separated into at least two light emitting sections by a non-light emitting separation layer, wherein a first light source (3*a*) of the at least two light sources corresponds to a first light emitting section and a second light source (3*b*) of the at least two light sources corresponds to a second light emitting section.

* * * * *